United States Patent [19]

Lückel et al.

[11] 4,313,365

[45] Feb. 2, 1982

[54] CONTROL VALVE FOR A SERVO-STEERING MECHANISM

[75] Inventors: Joachim Lückel, Paderborn; Rolf Povel, Stuttgart, both of Fed. Rep. of Germany

[73] Assignee: Daimler-Benz Aktiengesellschaft, Stuttgart, Fed. Rep. of Germany

[21] Appl. No.: 58,760

[22] Filed: Jul. 16, 1979

[30] Foreign Application Priority Data

Jul. 29, 1978 [DE] Fed. Rep. of Germany ....... 2833315

[51] Int. Cl.³ .......................... F15B 9/08; F15B 13/14
[52] U.S. Cl. ........................................ 91/372; 91/380; 91/390; 91/422; 91/434
[58] Field of Search ................. 91/370, 371, 372, 373, 91/390, 434, 380, 422; 180/132

[56] References Cited

U.S. PATENT DOCUMENTS 3,990,350  11/1976  Strauff ................................. 91/372
4,218,958  8/1980  Katz et al. ...................... 91/372 X Primary Examiner—Gerald A. Michalsky
Attorney, Agent, or Firm—Craig and Antonelli

[57] ABSTRACT

A control valve arrangement for a servo-steering mechanism which includes a valve control member responsive to arbitrary steering motions of a steering wheel by executing relative movement with respect to a valve housing. The control member is subdivided into two coupling elements movable relative to each other, which coupling elements are mutually resiliently supported. One of the coupling elements is, in a geared manner, connected to the steering wheel with the other coupling element being provided with four control edges cooperating with corresponding control edges of a valve housing. Two of the control edges control a throttling of two pressure medium connections of one working pressure chamber of the servo-steering mechanism with the other two control edges controlling a throttling of two pressure medium connections of a second working pressure chamber of the servo-steering mechanism.

21 Claims, 3 Drawing Figures

CONTROL VALVE FOR A SERVO-STEERING MECHANISM

The present invention relates to a valve arrangement and, more particularly, to a control valve for a servo-steering mechanism which includes a valve control member responding to arbitrary steering motions of a steering wheel with relative motions with respect to a valve housing. Control valves for a servo-steering mechanism have been proposed which operate in accordance with a flow principle with a valve housing of the control valve including a valve connection for a pump pressure line, a valve connection for an essentially pressure-relieved backflow line, as well as one valve connection for a working pressure chamber of a servomotor associated with a right-hand turn of the steering wheel and for a working pressure chamber associated with a left-turn of the steering wheel. The valve control member may be provided with four control edges respectively cooperating with one corresponding control edge of the valve housing with two of the control edges controlling a throttling of the two pressure medium connections of the valve connection of one working pressure chamber and the two other control edges controlling the throttling of the two pressure medium connections of the valve connections of the other working pressure chamber, respectively, with regard to the two remaining valve connections in an opposite sense.

One difficulty with a control valve of the aforementioned type lies in the fact that the proposed control valves are extremely sensitive to vibrations which sensitively may result in a malfunctioning of the control valve and hence the servo-steering mechanism.

The aim underlying the present invention essentially resides in providing a control valve for a servo-steering mechanism by which the sensitivity of the control valve to vibrations is reduced.

In accordance with advantageous features of the present invention, a valve control member is provided which is subdivided into two coupling elements which are movable relative to each other with the coupling elements being respectively mutually supported by way of a resilient means, with one of the coupling elements being connected by way of a gear means to the steering wheel and the other coupling element being provided with four control edges.

By virtue of the arrangement in accordance with the present invention, as far as vibrations are concerned, the control edge of the valve-control member is decoupled from the pick-up for the steering wheel angle, connected by a gear system, with the steering wheel.

The two coupling elements in accordance with the present invention may be fashioned as a control slide and a control sleeve or as an actuating arm and a control slide with compression springs being employed for resiliently supporting the coupling elements. The control slide or the actuating arm may be connected to the steering wheel by way of, for example, a coupling pin with the control sleeve or control slide of the other coupling element being provided with the control edges.

It is furthermore advantageous in the control valve of the present invention to produce a load-dependent steering moment at the steering wheel by means of reaction pressure surfaces which are exposable to a load-dependent reaction pressure so as to operatively associate the reaction pressure surfaces with the coupling element connected to the steering wheel by a gear means.

In servo-steering mechanisms, advantageously, in a region of the central position of the steering wheel for a straight-forward driving of a vehicle, the operation in such region is without servo-support with such operation being effected by use of a mechanical gear connection interposed between the steering wheel and the steered vehicle wheels. In such a situation, the valve-control member would be held in its neutral position wherein the servo-assist pressure is cut-off by means of centering springs. According to a further advantageous feature of the present invention, in the servo-steering mechanism, the centering is achieved by providing that the centering springs cooperate with the coupling element connected by a gear system with the steering wheel.

In the control valve of the present invention, external disturbances on the side of the vehicle wheels can advantageously be reduced by providing that the coupling element equipped with the control edges cooperates with at least one modulating pressure surface exposable to a modulating pressure proportional to the pressure in a working pressure chamber. The modulating pressure force of this modulating pressure surface tends to urge the coupling element, upon the occurrence of a pressure surge triggered by an external shock excitation of the working piston in this working pressure, into a position with respect to the valve housing which increases the pressure in this working chamber.

Advantageously, the reaction pressure surfaces, which impede the reaction of the control valve to disturbances on the vehicle wheel side, according to the present invention, cooperate with the coupling element connected by a gear system with the steering wheel and, consequently, do not affect the modulation of the coupling element provided with the control edges.

The control valve of the present invention can advantageously be supplied with an input or information for the steering velocity or turning rate of the steering wheel along the lines of a more rapid response at higher steering velocities by providing that at least one modulating pressure surface, which is adapted to be exposed to a modulating or additional pressure dependent upon the steering velocity, cooperates with the coupling element provided with the control edges for each steering wheel turn. The modulating pressure force of this modulating pressure surface tends to urge the coupling element, at higher steering velocities, into positions or operating pressures which are higher than in the case of lower steering velocities.

In accordance with a further advantageous feature of the control valve of the present invention, an especially direct and thus accurate input is obtained on the steering velocity by deriving the modulating pressure dependent on the steering velocity from a pick-up cylinder inserted operatively between the steering member connected by a gear system with the steering wheel and a steering gear box.

According to the present invention, the control valve may be integrated into the housing of the steering gear and, advantageously, a control sleeve provided with the control edges is axially movably and resiliently supported on a control slide connected by a gear system with the steering wheel.

In accordance with yet further advantageous features of the present invention, a control valve for a servo-steering mechanism is provided wherein the working piston, operatively connected with the steering shaft, accommodates a steering nut threadably movably connected with a steering worm, which nut has an actuating arm movable therewith for the valve control member. An especially direct and thus accurate dependency on the steering wheel may be obtained by providing that the steering nut is arranged to be movable in the working piston in directions of the steering worm axis. Moreover, the actuating arm may cooperate, by way of resilient means, with a control slide arranged in parallel to the steering worm axis in a valve housing bore of the working piston with the control slide being provided with the control edges.

Additionally, with the last-mentioned features, a time derivative or differential action of the work piston is advantageously attained with respect to the steering nut, which is movable relative to the working piston, when the coupling element provided with the control edges is placed under the effect of the modulating pressure dependent upon the steering velocity.

Additionally, it is also advantageous to immovably connect the steering nut provided with the actuating arm to one of the two pick-up components, i.e., the pick-up cylinder or pick-up piston, for the modulating pressure dependent upon the steering velocity and to immovably connect the steering gear box to the other pick-up component.

It is additionally advantageous with a control valve in accordance with the present invention to immovably connect the steering nut to one of the two reaction components, i.e., a reaction cylinder or reaction piston, so as to produce a load-dependent steering moment at the steering wheel and to immovably connect the working piston to the other reaction component.

Additionally, with a control valve of the present invention integrated into a steering gear box, an especially stable quiet behavior of the entire steering system can be obtained by using a servo-steering mechanism with a resilient and hydraulic support between the working piston and steering nut in the directions of the steering worm axis such as proposed, for example, in commonly assigned U.S. patent application Ser. No. 056,235, filed July 10, 1979, entitled "Servo-Steering Mechanism", now Pat. No. 4,249,456, (corresponding to German patent application P 28 33 316.6). Additionally, in this arrangement, a time differential or derivative action of the working piston with respect to the steering nut movable relative to the working piston is advantageously attained if the coupling element exhibiting the control edges is placed under the effect of the modulating pressure dependent upon the steering velocity.

With reaction pressure surfaces exposable to a load-dependent reaction pressure, a load-dependent steering wheel moment may be produced and the reaction pressure surfaces may cooperate with the coupling element connected by a gear system with the steering wheel.

Accordingly, it is an object of the present invention to provide a control valve for a servo-steering mechanism which avoids, by simple means, the shortcomings and disadvantages encountered in the prior art.

Another object of the present invention resides in providing a control valve for a servo-steering mechanism which reduces the sensitivity of the control valve to external vibrations.

A further object of the present invention resides in providing a control valve for a servo-steering mechanism by which a load-dependent steering moment is produced at the steering wheel by means of reaction pressure surfaces exposable to load-dependent reaction pressures.

Yet another object of the present invention resides in providing a control valve for a servo-steering mechanism by which it is possible to obtain direct and accurate information relating to the steering velocity.

A still further object of the present invention resides in providing a control valve for a servo-steering mechanism by which a differential action of the working piston thereof may be attained with respect to a steering nut of the steering system.

Yet another object of the present invention resides in providing a control valve for a servo-steering mechanism which is simple in construction and therefore relatively inexpensive to manufacture.

Another object of the present invention resides in providing a control valve for a servo-steering mechanism which functions reliably under all operating conditions.

These and other objects, features, and advantages of the present invention will become more apparent from the following description when taken in connection with the accompanying drawings which show, for the purposes of illustration only, two embodiments in accordance with the present invention, and wherein.

Figure 1:
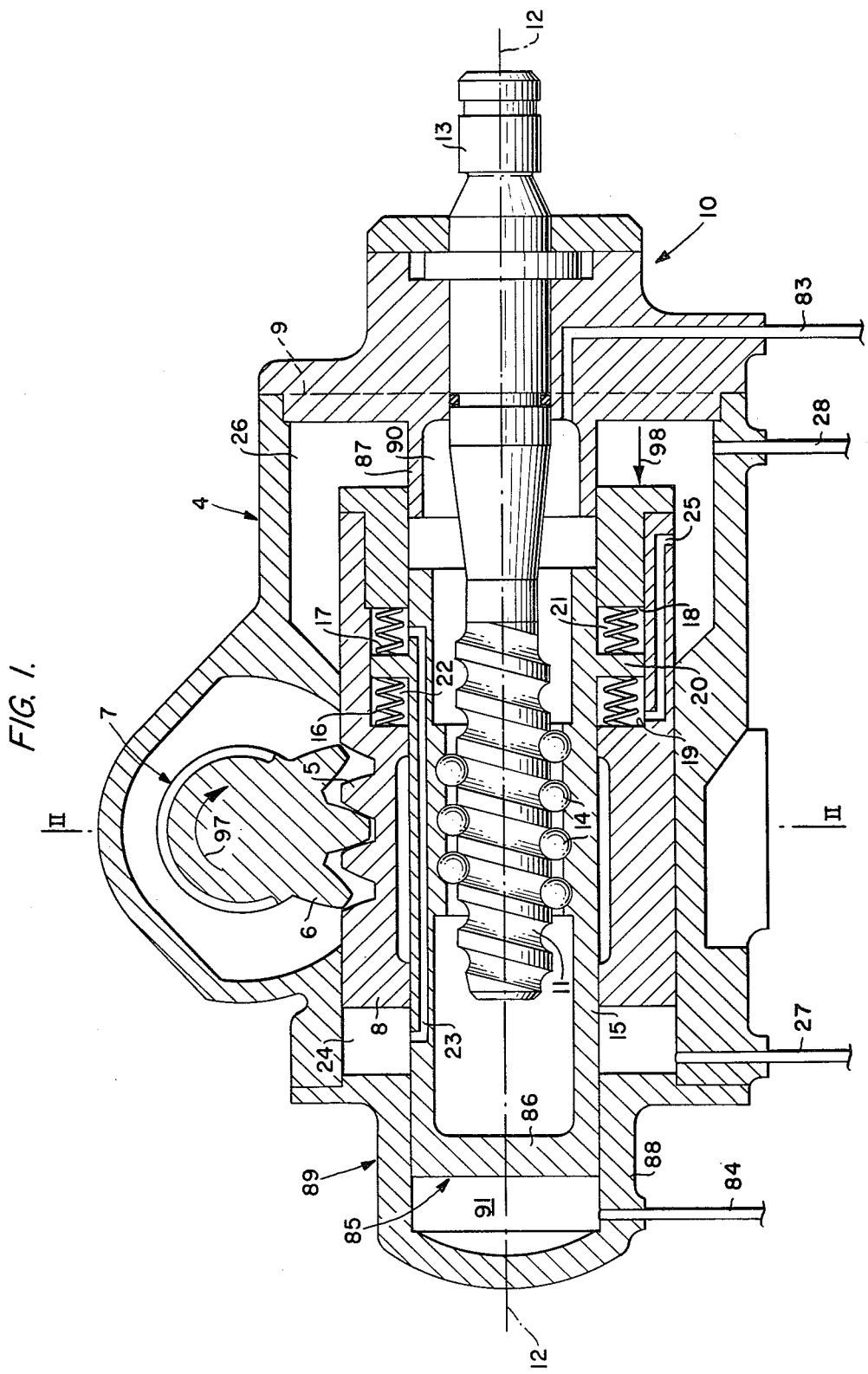
FIG. 1 is a partially schematic longitudinal cross-sectional view along an axis of the steering worm of a servo-steering mechanism having a control valve of the present invention integrated into a steering gear box thereof.
Figure 2:
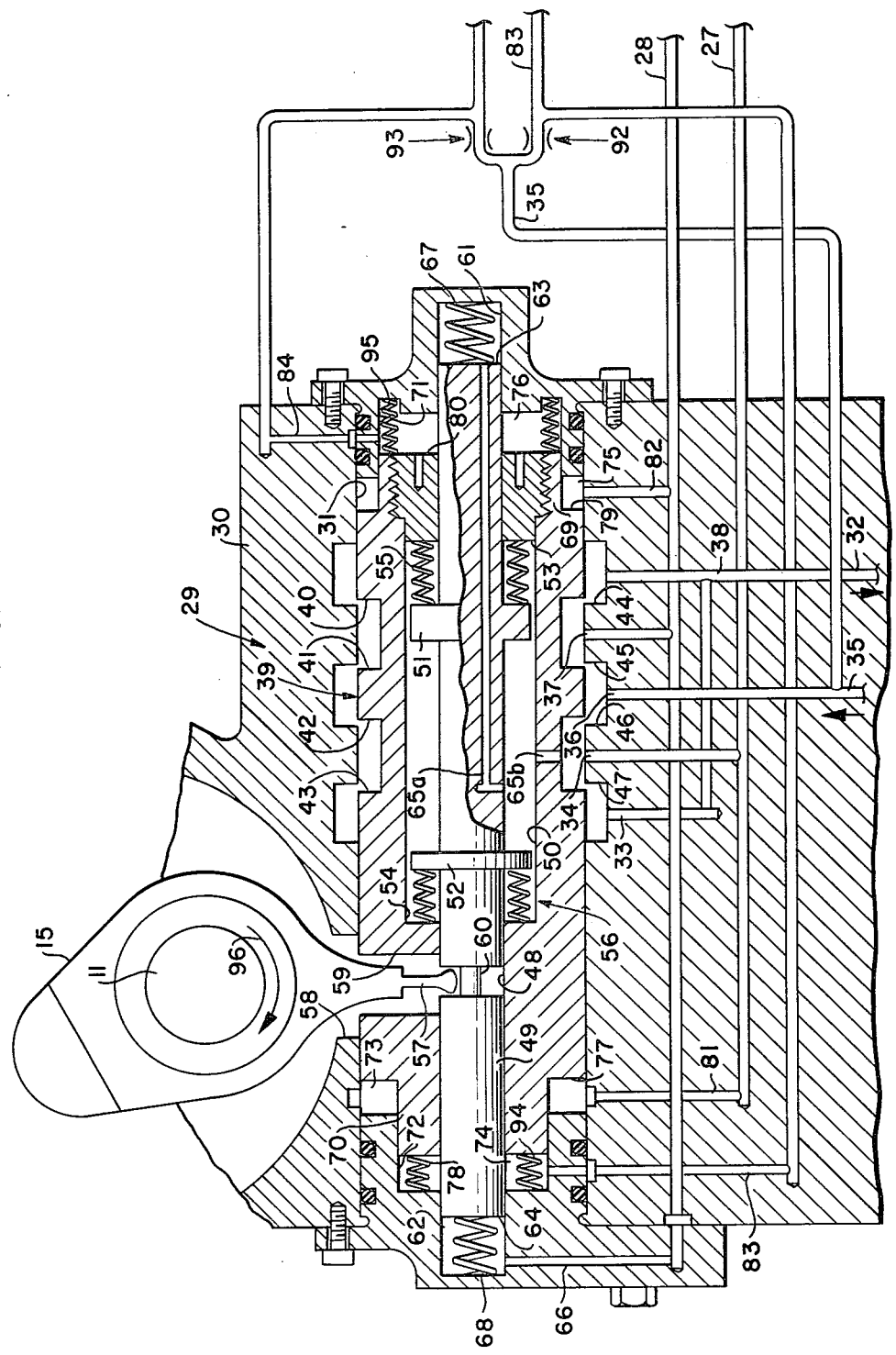
FIG. 2 is a cross-sectional view, containing the axis of the control valve, taken along line II—II in FIG. 1.

Referring now to the drawings wherein like reference numerals are used throughout the various views to designate like parts and, more particularly, to FIGS. 1 and 2, according to these figures, a servo-steering mechanism includes a housing generally designated by the reference numeral 4, constructed as a pressure medium cylinder for a working piston 8, in which is rotatably supported a steering shaft generally designated by reference numeral 7 in a manner not shown in detail in the drawings. The steering shaft 7 is in operative connection with the working piston 8 by a rack profile 5 formed at the working piston 8 and a corresponding toothed segment 6 which is provided at the steering shaft 7. A housing lid generally designated by reference numeral 10 closes off a mounting opening 9 of the housing 4. The mounting opening 9 is provided for enabling an introduction of the working piston 8 into the housing 4. A steering worm 11 is rotatably supported in the housing lid 10 but mounted so as to be nondisplaceable in a direction of the longitudinal axis 12—12 of the worm 11.

While the steering shaft 7 may be conventionally coupled by way of a steering pitman arm (not shown) and a steering linkage (not shown) with steerable vehicle wheels (not whown), the steering worm 11 may be nonrotatably connected to a steering wheel (not shown) by an external coupling pin 13. The steering worm 11 is threadably movably connected to a steering nut 15 (FIG. 1) by way of a recirculating ball unit 14. The steering nut 15 is supported, with respect to the working piston 8, in one direction of the steering worm axis 12—12 by way of soft compression springs 16 and in the other direction by means of soft compression springs 17. The working piston 8 subdivides the housing 4 into two working chambers 24, 26. A supporting piston 20, fashioned as a collar of the steering nut, subdivides a supporting cylinder into two pressure chambers 21, 22 defined or formed by two spaced radial end walls 18, 19 of the working piston 8, with the compression springs 16, 17 being accommodated in the pressure chambers 22, 21, respectively.

The pressure chamber 21 is connected by a pressure duct 23 in the working piston 8 to the working pressure chamber 24 of the housing 4 disposed on one side of the working piston 8 with the other pressure chamber 22 being connected by a pressure duct 25 to the working pressure chamber 26 of the housing 4 disposed on the other side of the working piston 8. By this arrangement, the pressure chamber 22, forming a hydraulic support together with the supporting piston 20, is connected in parallel with the compression springs 16. Correspondingly, the pressure chamber 21 cooperates with the supporting piston 20 as a further hydraulic support connected in parallel with the compression springs 17.

The working pressure chambers 24 and 26 are respectively connected by one working pressure line 27 and 28 to a control valve generally designated by the reference numeral 29 which, as shown in FIG. 2, includes a valve housing bore 31 lying in a section 30 of the housing 4 serving as a valve housing. Valve connections 33, 34, 36, 37 and 38 each terminate in the valve housing bore 31 with the valve connection 33 being in communication with a pressure-relieved backflow or return line 32; the valve connection 34 in communication with the working pressure line 27; the valve connection 36 in communication with a pump pressure line 35; the valve connection 37 in communication with the working pressure line 28; and valve connection 38 in communication with the backflow or return line 32.

A control or adjusting sleeve 39, slidably displaceably mounted in the valve housing bore 31, is provided with four control edges 40, 41, 42, 43 adapted to respectively cooperate with a control edge 44 or 45 or 46 or 47 of the valve housing bore 31. A central bore 48 is provided in the control sleeve 39 for guiding a control slide 49, slidably displaceably mounted therein, in a pressure-tight manner. The control slide 49 is provided with collar-type spring abutments 51 and 52 lying in a flaring section 50 of the central bore 48. Springs abutments 53 and 54, formed by wall sections which axially delimit the section 50 of the central bore 48, are relatively fixed with respect to the control sleeve 39. Compression springs 55, 56 are respectively supported between the spring abutments 51 and 53 or 52 and 54.

The steering nut 15 is integrally provided with a radially extending actuating arm 57 which penetrates into aligned openings 58, 59 of the housing 4 and control sleeve 39. A free end of the radial actuating arm 57 hingedly engages into an annular groove 60 of the control slide 49. The respective ends of the control slide 49 are slidably displaceably guided in a pressure-tight manner in respective reaction pressure chambers 61, 62 of the valve housing 30. The end faces of the control slide 49 respectively form a reaction pressure surface 63 and 64 which are adapted to be exposed to a pressure of the associated reaction pressure chambers 61, 62.

The reaction pressure chamber 61 is connected, by way of a reaction pressure duct 65a in the control slide 49, to the working pressure line 27 through the enlarged section 50 of the central bore 48, a reaction pressure duct 65b in the control sleeve 39, as well as the valve connection 34. In contrast thereto, the reaction pressure 62 is connected to the working pressure line 28 by way of a reaction pressure duct 66.

The control slide 49 is held, in the illustrated neutral position with respect to the valve housing 30, by means of centering springs 67, 68 which are arranged in the respective reaction pressure chambers 61, 62 and are respectively supported between the control slide 49 and the valve housing 30.

Stepped diameter sections or portions 69 and 70 are provided at respective end faces of the control slide 39 with the respective stepped sections being guided in a narrowed or reduced section 71, 72 of the valve housing bore 31 so as to be slidably displaceably guided therein in a pressure-tight manner. In this way, two annular modulating pressure chambers 73, 74 or 75, 76 are formed in the valve housing bore 31 at each end of the control sleeve 39. The pressure from these modulating pressure chambers 73, 74 or 75, 76 respectively acts on a modulating pressure surface 77 or 78 and 79 or 80 at the control sleeve 39. The mutually facing modulating pressure chambers 73, 75 are respectively connected by way of one modulating pressure duct 81 or 82 to a working pressure line 27 or 28. In contrast thereto, the two mutually facing modulating pressure chambers 74, 76 are respectively connected by way of one modulating pressure duct 83 or 84 to a pick-up generally designated by the reference numeral 85 (FIG. 1) for a modulating pressure dependent upon the steering velocity.

As shown in FIG. 1, the pick-up 85 includes a pick-up cylinder generally designated by the reference numeral 89 in which is arranged a dual-acting pick-up piston 86 formed by an end wall of the steering nut 15 with the pick-up piston 86 operating in two chambers 87, 88 of the housing 4 and subdividing the housing 4 into two respective pressure chambers 90, 91. The working piston 8 is guided with respect to the chamber 87 and with respect to the steering nut 15 and the pick-up piston 86 is guided with respect to the chamber 88 both in a slidable, displaceable manner and in a pressure-tight fashion.

The pressure chamber 90 is in communication with the modulating pressure duct 83 and is supplied by a pump pressure line by way of a throttle generally designated by the reference numeral 92 (FIG. 2). The pressure chamber 91 is in communication with the modulating pressure duct 84 and is supplied by the pump pressure line by way of a throttle generally designated by the reference numeral 93 (FIG. 2). The backflow or return line 32 leads to a pressure medium reservoir (not shown) from which a pressure pump (not shown) takes in pressure medium. A delivery side of the pressure pump is connected to the pump pressure line 35.

Centering springs 94, 95 are respectively arranged in the mutually facing modulating pressure chambers 74, 76 and the control sleeve is supported by way of the centering springs 94, 95 with respect to the valve housing 30.

The servo-steering mechanism and control valve arrangement of FIGS. 1 and 2 operates as follows:

In case of a right-hand turn of the steering wheel, the motion of the steering wheel is transmitted by the coupling pin 13 (FIG. 1) so that the steering nut 15 responds with its actuating arm 57 by a relative motion in a direction of the arrow 96 (FIG. 2) with respect to the valve housing 30 so that the control slide valve 49 operates the control sleeve 39 through the compression springs 56 in such a manner that the pressure medium communication between the valve connection 37 of the working pressure chamber 26 and the associated valve connection 38 of the backflow or return line 32 is throttled to a larger extent by the pair of control edges 40, 44; whereas, the pressure medium communication between the valve connection 37 and the valve connection 36 of the pump pressure line 35 is opened up to a larger extent by the pair of control edges 41, 45. In a reverse sense, the pressure medium communication between the valve connection 34 of the working pressure chamber 24 and the associated valve connection 33 of the backflow or return line 32 is open to a larger extent by the pair of control edges 43, 47; whereas, the pressure medium communication of the valve connection 34 to the valve connection 36 of the pump pressure line 35 is throttled to a larger extent by the pair of control edges 42, 46. In this manner, a higher operating pressure is obtained in the working pressure chamber 26 than in the working pressure chamber 24 so that the working piston 8 exerts, on the steering shaft 7, a steering moment in a direction of the arrow 97 in FIG. 1.

A reaction pressure proportional to the working pressure of the working pressure chamber 26 is ambient in the reaction pressure chamber 62 so that the reaction pressure force resultant at the reaction pressure surface 64 of the control slide 49 exerts a steering moment on the steering wheel through the coupling pin 13 by way of the actuating arm 57. If a turning of the steering wheel transmitted through the coupling pin 13 takes place relatively rapidly, that is, at a higher than normal steering speed, then a relatively high modulating pressure is built up by the pick-up piston 86 in the pressure chamber 91. Consequently, the modulating pressure force resulting at the modulating pressure surface 80 of the control sleeve 39 displaces the control sleeve 39 relatively to the control slide 49 and thereby increases the pressure differential between the working pressure chambers 24 and 26 so that the working piston 8, under the combined tensioning of the compression springs 17, executes a derivative or differential relative motion in the direction of the arrow 98 (FIG. 1) with respect to the steering nut 15.

In case of the introduction of an external shock moment by, for example, the roadway through the steered vehicle wheels into the steering shaft 7 in a direction opposite of the direction of the arrow 97 (FIG. 1), a pressure surge occurs in the working pressure chamber 26 so as to trigger, at the modulating pressure surface 79 of the control sleeve 39, a modulating pressure force which displaces the control sleeve 39 with respect to the control slide 49 in such a way that the pair of control edges 40, 44 throttle the pressure medium communication between the valve connection 37 of the working pressure chamber 26 and the associated valve connection 38 of the backflow or return line 32 to a larger extent and so that the pair of control edges 41, 45 open up the pressure medium communication between the valve connection 37 and the valve connection 36 of the pump pressure line 35 to a larger extent. In this manner, the pressure in the working pressure chamber 26 is increased and the pressure in the working pressure chamber 24 is reduced so that the disturbing moment on the side of the vehicle wheel is reduced in its effect and/or eliminated.

With a left-hand turn of the steering wheel, the turning motion of which is transmitted by the coupling pin 13 (FIG. 1), the actuating arm 57 responds with a relative movement in a direction opposite of the arrow 96 so that the control sleeve 39 is operated by way of the compression springs 55 whereby now a higher pressure is correspondingly set in the working pressure chamber 24. Consequently, the differential pressure force resulting at the working piston 8 exerts a steering moment on the steering shaft 7 in a direction opposite of the arrow 97 (FIG. 1). If the left-hand turning of the steering wheel takes place relatively quickly, that is, at a higher steering velocity, then the pick-up piston 86 builds up a relatively high modulating pressure in the pressure chamber 90 so that the modulating pressure force resultant on the modulating pressure surface 78 of the control sleeve 39 displaces the latter with respect to the control slide 49 in such a manner that a pressure increase occurs in the working pressure chamber 24 so that the working piston 8, under the combined tensioning of the compression springs 16, executes a derivative or differential relative motion with respect to the steering nut 15.

In the event an external shock moment is introduced into the steering shaft from the roadway by way of the steered vehicle wheels in a direction of the arrow 97 (FIG. 1), a pressure surge occurs in the working pressure chamber 24 which pressure surge triggers a modulating pressure in the modulating pressure chamber 73. Consequently, the modulating pressure force resulting at the modulating pressure surface 77 displaces the control sleeve 39 with respect to the control slide 49 in such a way that the pressure in the working pressure chamber 24 is increased and thus the external shock moment is reduced in its effect and/or eliminated.

Figure 3:
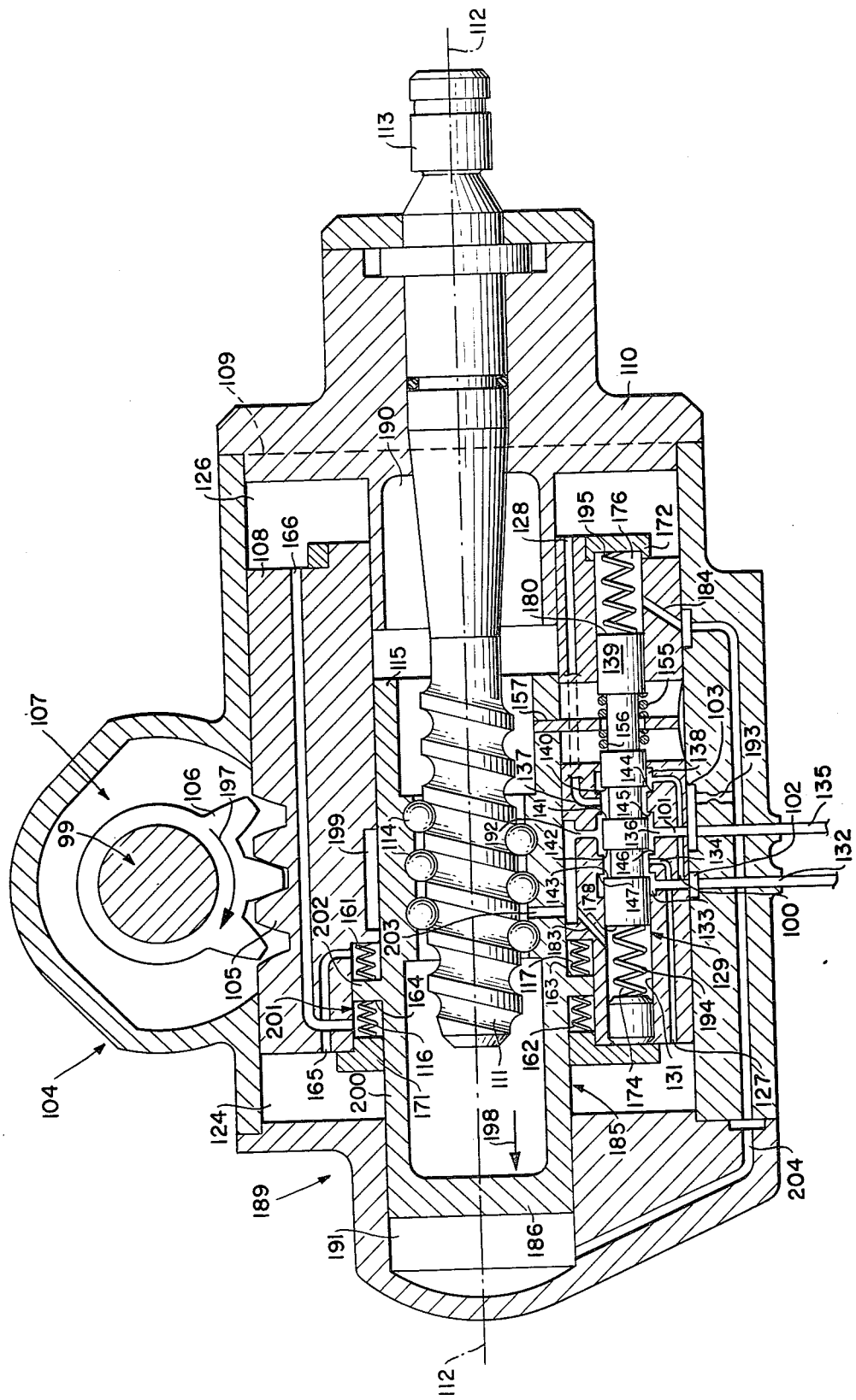
FIG. 3 is a partially schematic axial cross-sectional view along an axis of the steering worm and control valve axis of another embodiment of a servo-mechanism containing the control valve of the present invention integrated into a working piston of the servo-steering mechanism.

In the servo-steering mechanism according to FIG. 3, a second arrangement of the control valve of the present invention is shown with the components and items functionally corresponding to the arrangement of FIGS. 1 and 2 being denoted by the same reference numerals as in FIGS. 1 and 2 but in each case increased by 100.

As shown in FIG. 3, a steering shaft generally designated by the reference numeral 107 and a steering worm 111 are arranged in a housing generally designated by the reference numeral 104 which is constructed as a pressure medium cylinder for a working piston 108. The steering shaft 107 and steering worm 111 are mounted so as to be rotatable with respect to the housing 104 but essentially nondisplaceable in a direction of their respective longitudinal axes 99 and 112—112. The steering shaft 107 is in operative connection with the working piston 108 by way of toothed segment 106 which is nonrotatable with respect to the shaft 107. The toothed segment 106 is adapted to engage a rack profile 105 provided at the working piston 108. A coupling pin 113 for coupling the steering worm 111 to the steering wheel (not shown) is provided on a portion of the steering worm 111 which extends through a housing lid 110 toward the outside of the servo-steering mechanism. The housing lid 110 is adapted to close off a mounting opening 109 in the housing 104 through which the working piston 108 is introduced. The coupling pin provides for the nonrotatable connection of the steering worm 111 with the steering wheel.

A steering nut 115, threadably movably connected to the steering worm 111 by way of a recirculating ball unit 114, is supported with respect to the working piston 108 so as to be substantially nonrotatable but movable in the direction of the axis 112—112 of the steering worm 111 by way of compression springs 116, 117. The working piston 108 divides the housing 104 into two working pressures 124, 126. The working pressure chambers 124, 126 are respectively in communication by way of one working pressure duct 127, 128 with a control valve generally designated by the reference numeral 129 integrated into the working piston 108. The control valve 129 includes a control or adjusting slide 139 displaceable in a valve housing bore 131 of the working piston 108. The control slide 139 is operated by way of compression springs 155, 156 by an actuating arm 157 immovably connected with respect to the steering nut 115.

Valve connections 133, 134, 136, 137, 138 each terminate in the valve housing bore 131 with the valve connection 133 being in communication with an essentially pressure-relieved backflow or relief line 100; the valve connection 134 being in communication with the working pressure line 127; the valve connection 136 being in communication with a pump pressure line 101; the valve connection 137 being in communication with the working pressure line 128; and the valve connection 138 being in communication with the backflow or return line 100.

The control slide 139 is provided with control edges 140, 141, 142, 143 cooperating with corresponding control edges 144, 145, 146, 147 of the valve housing bore 131. A backflow or return line 132, leading to a pressure medium reservoir (not shown) is connected to a groove 102 of the housing 104. The groove 102 is maintained closed by the working piston 108 and is in constant communication with the backflow or return line 100. A pressure pump (not shown) takes in pressure medium from the pressure medium reservoir with a pressure side of the pressure pump being connected to the pressure line 135 leading to a groove 103 of the housing 104. The groove 103 is kept closed by the working piston 108 but is in constant communication with the pump pressure line 101.

A recess generally designated by the reference numeral 201 is provided in the working piston 108 with the recess 201 being kept sealed by a tank-shaped sleeve 200 integrally formed with the steering nut 115 and disposed coaxially thereto. The recess 201 forms a reaction pressure cylinder. A dual-acting reaction pressure piston 202 is provided which is immovable with respect to the sleeve 20 and with respect to the steering nut 115. The reaction pressure piston 202 subdivides the reaction pressure cylinder 201 into a reaction pressure chamber 161 in communication with the working pressure chamber 124 by way of a reaction pressure duct 165 and a reaction pressure chamber 162 in communication with the working pressure chamber 126 by way of a reaction pressure duct 166.

A reaction pressure force respectively proportional to the operating pressure of the respective working pressure chamber 124 or 126 results at the reaction pressure surfaces 163 and 164 of the reaction pressure piston 202 with the reaction pressure force making itself felt at the steering wheel as a steering moment by way of the steering worm 111. At the same time, the reaction pressure piston 202 and the reaction pressure chambers 161 and 162 operate in the same manner as the hydraulic supports provided by the piston 20 and the pressure chambers 21 and 22 of the arrangement of FIGS. 1 and 2.

A pick-up generally designated by the reference numeral 185 for a modulating pressure dependent on the steering velocity is provided with the pick-up 185 being responsive to a relative movement between the housing 104 and steering nut 115.

The pick-up 185 includes a chamber or recess 190 which is adapted to be kept in a closed condition by both the sleeve 200 and the working piston 108 and a chamber or recess 191 which is adapted to be kept closed only by the sleeve 200. The chambers 190, 191 and the housing 104 form a pick-up cylinder generally designated by the reference numeral 189. A dual-acting piston 186, formed by an end wall of the sleeve 200, is arranged in the pick-up cylinder 189 with the dual-acting piston being immovable with respect to the steering nut 115.

The pressure chamber 190 is respectively in constant communication, by way of a bore 203 of the sleeve 200 in a groove 199 in the working piston 108, with a modulating pressure duct 183 as well as with the pump pressure line 101 by way of a throttle 192. The other pressure chamber 191 is respectively in constant communication, by way of a housing duct 204, with a modulating pressure duct 184 as well as with a groove 103 by way of a throttle 193. One modulating pressure chamber 174 and 176 of the valve housing bore 131 is disposed at the respective end faces of the control slide 139 with each of these modulating pressure chambers being respectively connected to one of the modulating pressure ducts 183 and 184. Modulating pressure surfaces 178, 180 of the control slide 139 are adapted to be exposed to the pressure of the modulating pressure chambers 174, 176.

Centering springs 194, 195 are disposed in the respective modulating pressure chambers 174, 176 with the springs 194, 195 resting on respective lids 171, 172 which lids close off the valve housing bore 131. The lids 171, 172 are arranged so as to be immovable with respect to the working piston 108 so that the springs 194, 195 tend to hold the control slide 139 in the illustrated neutral position with respect to the valve connections 133, 134, 136, 137, 138. In contrast thereto, the actuating arm 157 is held in the illustrated neutral position with respect to the valve connections 133, 134, 136, 137, 138 by means of compression springs 116, 117 which likewise operate as a centering means.

In all other respects, the arrangement of FIG. 3 functions in the same manner as the servo-steering mechanism and the control valve of the arrangement of FIGS. 1 and 2.

With a right-hand turn of the steering wheel, the turning action of which is transmitted by the coupling pin 113 (FIG. 3), the steering nut 115 responds with its actuating arm 157 by a relative motion in the direction of the arrow 198 with respect to the working piston 108 so that the actuating arm 157 operates the control slide 139 by way of the compression springs 156 in such a way that the four pairs of control edges 140, 144 and 141, 145 as well as 143, 147 and 142, 146 set a higher pressure in the working pressure chamber 126 than in the other working pressure chamber 124. The differential pressure force thus resulting at the working piston 108 exerts a steering moment on the steering shaft 107 in a direction of the arrow 197.

A reaction pressure proportional to the working pressure in the working pressure chamber 126 is ambient in the reaction pressure chamber 162 so that the reaction pressure force resulting at the reaction pressure surface 164 of the steering nut 115 exerts, by way of the recirculating ball unit 114, a steering moment on the steering wheel through the coupling pin 113. If the turning of the steering wheel proceeds relatively quickly, that is, at a higher than normal steering velocity, then a relatively high modulating pressure is built up by the pick-up piston 186 in the pressure chamber 191 of the pick-up cylinder 189. Consequently, the modulating pressure force resulting at the modulating pressure surface 180 of the control slide 139 displaces the control slide 139 with respect to the actuating arm 157 and thereby still further increases the pressure differential between the working pressure chambers 124 and 126 so that the working piston 108, with the combined tensioning of the compression springs 117, executes a differential or derivative relative motion with respect to the steering nut 115 in the direction of the arrow 198.

In case of a left-hand turning of the steering wheel, a pressure differential is correspondingly set in the manner described hereinabove, in the working pressure 124 whereby a steering moment in a direction opposite of the arrow 197 is produced at the steering shaft 107.

The servo-steering mechanism of the arrangements of FIGS. 1 and 2 and FIG. 3 may be constructed so that the steering nut 15 or 115 threadably movably connected with the steering worm 11 or 111 are supported with respect to the working piston 8 or 108 so as to be rotatable and also axially movable by the compression springs in the directions of the steering worm with the steering nut 15 or 115 being additionally supported in the direction of the steering worm axis 12—12 or 112—112 by way of at least one additional hydraulic support connected with the hydraulic system of a servomotor in accordance with the aforementioned copending United States patent application Ser. No. 056,235, now U.S. Pat. No. 4,249,456.

While we have shown and described only two embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A control valve arrangement for a servo-steering mechanism which includes a valve housing and a valve control member disposed in the valve housing, the valve control member being responsive to arbitrary steering motions of a steering wheel means and being adapted to execute relative movements with respect to the valve housing, a first working pressure chamber means in the housing for providing a servo-assist during a right-hand turning of the steering wheel means, a second working pressure chamber means in the housing for providing a servo-assist during a left-hand turning of the steering wheel means, the valve housing including a first valve connection means for connecting the valve housing with a pump pressure line, a second valve connection means for connecting the valve housing with a pressure medium return line, a third valve connection means for connecting the first working pressure chamber means with a pressure medium source, and a fourth valve connection means for connecting the second working pressure chamber means with a pressure medium source, and control means provided on the valve control member and cooperable with control means of the valve housing for controlling a throttling of the valve connection means of the respective working pressure chamber means, characterized in that the valve control member includes two coupling elements mounted in the valve housing so as to be movable relative to each other, a resilient means for respectively mutually supporting the coupling elements, gear means for connecting a first of the coupling elements to the steering wheel means, and in that the control means provided on the valve control member is arranged on the other of the coupling elements, wherein the control means provided on the other coupling element includes a first set of four control edges constructed to cooperate with a second set of corresponding control edges provided at the valve housing in such a manner that all four control edges of the first set are constrained to move jointly relative to all of the control edges of the second set, two of the control edges being adapted to control a throttling of two pressure medium connections of the valve connections of one of the working pressure chamber means and the two other control edges being adapted to control two pressure medium connections of the valve connections of the other working pressure chamber means.

2. A control valve arrangement according to claim 1, including reaction pressure surface means adapted to be exposed to a load-dependent reaction pressure for producing a load-dependent moment on the steering wheel means, characterized in that the reaction pressure surface means are cooperable with the first of the coupling elements.

3. A control valve arrangement according to claim 2, with a pretension centering spring means for holding the control valve member in a neutral position with respect to the valve housing, characterized in that the centering spring means are arranged so as to cooperate with the first of the coupling elements.

4. A control valve arrangement according to claim 3, characterized in that at least one modulating pressure surface means is provided which is cooperable with the other of the coupling elements, means are provided for exposing the at least one modulating pressure surface means to a modulating pressure proportional to a pressure of one of the working pressure chamber means, said modulating pressure surface means being adapted to urge said other coupling element into a position with respect to the valve housing so as to increase the pressure of said one working pressure chamber means upon an occurrence of a pressure surge triggered by an external shock applied to the servo-mechanism.

5. A control valve arrangement according to claim 4, characterized in that at least one further modulating pressure surface means is provided and associated with each turning direction of the steering wheel means, the at least one further modulating pressure surface means being cooperable with said other coupling element, means are provided for exposing the further modulating pressure surface means to a modulating pressure dependent upon steering velocity, said further modulating pressure surface means being adapted to urge said other coupling element into positions for higher operating pressure when the steering wheel means is turned at higher steering velocities.

6. A control valve arrangement according to claim 5, characterized in that the steering wheel means includes a steering member disposed in the valve housing, and in that the means for exposing the further modulating pressure surface means to a modulating pressure dependent upon steering velocity comprises a pick-up means including a pick-up cylinder operatively connected to the steering member.

7. A control valve arrangement according to claim 5, characterized in that the first coupling element is constructed as a control slide, said other coupling element is constructed as a control sleeve, and in that the control sleeve is axially resiliently movably supported on said control slide.

8. A control valve arrangement according to claim 7, characterized in that the steering member includes a steering nut threadably movably connected to a steering worm, a working piston means divides the valve housing means into the first and second working pressure chamber means, the steering nut is arranged in the working piston means so as to be movable in a direction of a longitudinal axis of the steering worm, the control slide is disposed in a valve housing bore of the working piston means so as to extend parallel to the axis of the steering worm, and in that the steering nut includes an actuating arm cooperable by resilient means with said other coupling element.

9. A control valve arrangement according to claim 8, characterized in that the pick-up means further includes a pick-up piston disposed in the pick-up cylinder, and in that the actuating arm is fixedly connected to one of the pick-up cylinder and pick-up piston and the other of the pick-up cylinder and pick-up piston is fixedly connected to the valve housing.

10. A control valve arrangement according to claim 9, characterized in that the reaction pressure surface means includes a reaction cylinder means and a reaction piston means arranged therein, and in that the steering nut is fixedly connected to one of the reaction cylinder means and the reaction piston means, and the working piston means is fixedly connected to the other of the reaction cylinder means and reaction piston means.

11. A control valve arrangement according to claim 10, characterized in that hydraulic support means are provided between the working piston means and the steering nut for supporting the working piston means in a direction of the steering worm axis.

12. A control valve arrangement according to claim 3, wherein all of said first through fourth connection means are open for communicating the respective working pressure chamber means with the pressure medium source and return line when said control valve member is in said neutral position.

13. A control valve arrangement according to claim 1, characterized in that the steering member includes a steering nut threadably movably connected to a steering worm, a working piston means divides the valve housing into the first and second working pressure chamber means, the steering nut is arranged in the working piston means so as to be movable in a direction of a longitudinal axis of the steering worm, the control valve member is disposed in a valve housing bore of the working piston means so as to extend in parallel to the axis of the steering worm, and in that the steering nut includes an actuating arm cooperable by resilient means with one of the coupling elements.

14. A control valve arrangement according to claim 13, characterized in that at least one modulating pressure surface means is provided which is associated with each turning direction of the steering wheel means, said at least one further modulating pressure surface means being cooperable with said other coupling element, means are provided for exposing said modulating pressure surface means to a modulating pressure dependent upon steering velocity, said further modulating pressure surface means being adapted to urge said other coupling element into positions for higher operating pressure when the steering wheel means is turned at higher steering velocities.

15. A control valve arrangement according to claim 14, characterized in that the steering wheel means includes a steering member disposed in the valve housing, and in that the means for exposing the modulating pressure surface means to a modulating pressure dependent upon steering velocity comprises a pick-up means including a pick-up cylinder and a pick-up piston disposed therein, and in that the actuating arm is fixedly connected to one of the pick-up cylinder and pick-up piston and the other of the pick-up cylinder and pick-up piston is fixedly connected to the valve housing.

16. A control valve arrangement according to one of claims 13, 14, or 15, including reaction pressure surface means adapted to be exposed to a load-dependent reaction pressure for producing a load-dependent movement on the steering wheel means, characterized in that the reaction pressure surface means includes a reaction cylinder means and a reaction piston means arranged therein, and in that the steering nut is fixedly connected to one of the reaction cylinder means and the reaction piston means, and the working piston means is fixedly connected to the other of the reaction cylinder means and reaction piston means.

17. A control valve arrangement according to claim 13, characterized in that hydraulic support means are provided between the working piston means and the steering nut for supporting the working piston means in a direction of the steering worm axis.

18. A control valve arrangement for a servo-steering mechanism which includes a valve housing and a valve control member disposed in the valve housing, the valve control member being responsive to arbitrary steering motions of a steering wheel means and being adapted to execute relative movements with respect to the valve housing, a first working pressure chamber means in the housing for providing a servo-assist during a right-hand turning of the steering wheel means, a second working pressure chamber means in the housing for providing a servo-assist during a left-hand turning of the steering wheel means, the valve housing including a first valve connection means for connecting the valve housing with a pump pressure line, a second valve connection means for connecting the valve housing with a pressure medium return line, a third valve connection means for connecting the first working pressure chamber means with a pressure medium source, and a fourth valve connection means for connecting the second working pressure chamber means with a pressure medium source, and control means provided on the valve control member and cooperable with control means of the valve housing for controlling a throttling of the valve connection means of the respective working pressure chamber means, characterized in that the valve control member includes two coupling elements mounted in the valve housing so as to be movable relative to each other, a resilient means for respectively mutually supporting the coupling elements, gear means for connecting a first of the coupling elements to the steering wheel means, and in that the control means provided on the valve control member is arranged on the other of the coupling elements, further characterized in that at least one modulating pressure surface means is provided which is cooperable with the other of said coupling elements, means are provided for exposing the at least one modulating pressure surface means to a modulating pressure proportional to a pressure of one of the working pressure chamber means, said modulating pressure surface means being adapted to urge said other coupling element into a position with respect to the valve housing so as to increase the pressure of said one working pressure chamber means upon an occurrence of a pressure surge triggered by an external shock applied to the servo-mechanism.

19. A control valve arrangement according to claim 18, characterized in that at least one further modulating pressure surface means is provided and associated with each turning direction of the steering wheel means, the at least one further modulating pressure surface means being cooperable with said other coupling element, means are provided for exposing the further modulating pressure surface means to a modulating pressure dependent upon steering velocity, said further modulating pressure surface means being adapted to urge said other coupling element into positions for higher operating pressure when the steering wheel means is turned at higher steering velocities.

20. A control valve arrangement according to claim 19, characterized in that the steering wheel means includes a steering member disposed in the valve housing, and in that the means for exposing the further modulating pressure surface means to a modulating pressure dependent upon steering velocity comprises a pick-up means including a pick-up cylinder operatively connected to the steering member.

21. A control valve arrangement according to claim 20, characterized in that the first coupling element is constructed as a control slide, said other coupling element is constructed as a control sleeve, and in that the control sleeve is axially resiliently movably supported on said control slide.

* * * * *